United States Patent
Ogawa et al.

(10) Patent No.: US 9,492,791 B2
(45) Date of Patent: Nov. 15, 2016

(54) METHOD OF ESTIMATING STABLE STATE MEMBRANE FILTRATION FLUX

(75) Inventors: Takashi Ogawa, Tokyo (JP); Yoshihiko Mori, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 1711 days.

(21) Appl. No.: 11/792,112

(22) PCT Filed: Nov. 30, 2005

(86) PCT No.: PCT/JP2005/022016
§ 371 (c)(1),
(2), (4) Date: Jun. 1, 2007

(87) PCT Pub. No.: WO2006/059658
PCT Pub. Date: Jun. 8, 2006

(65) Prior Publication Data
US 2008/0163698 A1    Jul. 10, 2008

(30) Foreign Application Priority Data
Dec. 3, 2004 (JP) ................................. 2004-350897

(51) Int. Cl.
| | |
|---|---|
| *B01D 61/14* | (2006.01) |
| *B01D 61/22* | (2006.01) |
| *B01D 65/10* | (2006.01) |
| *C02F 1/44* | (2006.01) |

(52) U.S. Cl.
CPC ............... *B01D 61/14* (2013.01); *B01D 61/22* (2013.01); *B01D 65/10* (2013.01); *C02F 1/444* (2013.01); *B01D 2311/16* (2013.01); *B01D 2311/22* (2013.01); *B01D 2325/28* (2013.01)

(58) Field of Classification Search
CPC ...... B01D 61/14; B01D 61/22; B01D 65/10; B01D 2311/22; B01D 2325/28; B01D 2311/16; C02F 1/444
See application file for complete search history.

(56) References Cited

U.S. PATENT DOCUMENTS 6,077,435 A    6/2000    Beck et al.

FOREIGN PATENT DOCUMENTS

| EP | 1 343 575 B1 | 9/2003 |
|---|---|---|
| JP | 2001-327967 | 11/2001 |
| JP | 2003-322605 | 11/2003 |

OTHER PUBLICATIONS

Advanced Aqua Clean Technology for $21^{st}$ Century (ACT 21) New Development of City Water Membrane Filtration Technology, published by the Japan Water Research Center, Dec. 2002, pp. 200-204, 227-230, 257-274, and 277-279.

*Primary Examiner* — Shogo Sasaki
(74) *Attorney, Agent, or Firm* — Finnegan, Henderson, Farabow, Garrett & Dunner, L.L.P.

(57) ABSTRACT

It is an object of the present invention to provide a method of estimating the maximum value of the flux during long-term stable operation including cleaning of a membrane filtration plant based on measured data of a membrane filtration characteristic during initial membrane filtration. The present invention provides a method in which the maximum flux during stable operation of a new membrane filtration plant for which a membrane module and operating conditions have been specified is estimated from a measured value A of an initial membrane filtration characteristic measured using a liquid to be treated in and a membrane of a membrane module of the new membrane filtration plant, an empirical value of a maximum flux during stable operation of each of a plurality of existing membrane filtration plants having the same or a similar membrane module and operating conditions, and a measured value B of the initial membrane filtration characteristic measured using a liquid to be treated in and a membrane of a membrane module of each of the existing membrane filtration plants.

7 Claims, 10 Drawing Sheets

(a)

(b)

METHOD OF ESTIMATING STABLE STATE MEMBRANE FILTRATION FLUX

CROSS-REFERENCE TO RELATED APPLICATIONS

This application is a national phase application of International Application No. PCT/JP2005/022016, filed Nov. 30, 2005, and claims the priority of Japanese Application No. 2004-350897, filed Dec. 3, 2004, the content of both of which is incorporated herein by reference.

TECHNICAL FIELD

The present invention relates to a method of estimating the value of a membrane filtration flux in its stable state, required for designing a new membrane filtration plant, based on initial membrane filtration test data.

BACKGROUND ART

In a membrane filtration plant that uses filtration membranes such as ultrafiltration membranes or precise filtration membranes, a liquid to be separated is passed through a membrane module, and pressure is applied to the liquid from outside the membrane module. Desired filtration is then carried out under conditions at which a certain flux can be obtained, based mainly on the size of the pores in the membranes.

The nature of the liquid to be treated in a membrane filtration plant varies between membrane filtration plants, and it is often the case that various substances contained in the liquid cause so-called fouling such as clogging of the membranes so that the flux decreases rapidly or gradually. In a membrane filtration plant, physical cleaning such as air bubbling, or flushing is thus carried out repeatedly at relatively short time intervals to restore the membrane performance to some extent. Moreover, within a condition assuming chemical cleaning that thoroughly restores the membrane performance to be carried out, for example, once every six months, and within a range of possible operating conditions, a state under which operation can be carried out stably over the six months, by the next chemical cleaning, is determined, and out of such conditions, operation is generally carried out using conditions for which the efficiency is best.

Typical behavior of the operating pressure during stable operation under the condition of constant flow rate in a membrane filtration plant is shown in FIG. 10(*a*). In FIG. 10(*a*), the horizontal axis shows the operating time in days, and the vertical axis shows the operating pressure. An enlarged view of the portion enclosed by the circle in FIG. 10(*a*) is shown in FIG. 10(*b*). FIG. 10(*b*) shows the short-term pressure change associated with periodic cleaning. As can be seen from FIG. 10(*a*), the operating pressure rises rapidly at the start of operation. However, once the initial period has elapsed, a stable period begins and the operating pressure gradually rises with a constant gradient with the operating time. After the stable period, a final period begins and the operating pressure rises rapidly approaching the operating limit of a liquid feeding pump, whereupon chemical cleaning of the filtration membranes becomes necessary.

As the conditions of the operation of the membrane filtration plant, when assuming in advance that an operation time period is from this initial period to this final period and that the short-term cleaning is carried out, it is most efficient to operate at the maximum flux at which operation can be carried out stably at a constant flow rate over this time period. Therefore, when designing the membrane filtration plant, the maximum value of the flux in a stable state is estimated, taking the fixed short-term cleaning conditions and an operating time period between the chemical cleanings into consideration, and the design scale of the membrane filtration plant is determined accordingly.

However, the stable state flux during actual operation is affected by the type of substances contained in, the nature of particles in, and the concentration and so on of the liquid to be treated with pre-treatment included, and furthermore is considered to be affected in a complex way by various conditions such as the filtration membrane characteristics, interaction between substances contained in the liquid to be treated and the filtration membranes, the filtration membrane cleaning conditions, the operating conditions, and so on. Conventionally, due to such complex interactions, it has been considered to be completely impossible to estimate the stable state flux value in advance.

As an attempt to estimate this, there has been proposed, for example, a method known as the SDI (silt density index) measurement method in which the liquid to be treated is subjected to filtration for a fixed time at a constant pressure using a certain filtration filter, and it is attempted to determine the stable state flux value from the measured value of the flow rate at the time of starting the filtration and the time of ending the filtration. However, this method can only be used in a very narrow water quality range, and hence is not very practicable. Moreover, in Japanese Patent Application Laid-open No. 2001-327967 (Patent Document 1), there is described a method in which it is attempted to optimize a membrane filtration flux, a physical cleaning interval, a chemical cleaning timing, pre-treatment and so on from a function of measured values of a turbid matter amount and a soluble organic carbon amount, and the membrane filtration flux. However, in that invention, DOC, E260, and turbidity must be analyzed, which is complicated. Moreover, the cause of organic contamination is specified as being humic matter, the extent of contamination being calculated purely from the ratio between DOC and E260, and hence in the case that organic matter other than humic matter contributes to membrane contamination, the effect thereof cannot be properly evaluated.

Conventionally, when designing a new membrane filtration plant, it has thus generally been the case that membrane module(s) with one type or a plurality of types of candidate membrane(s) is/are used, and while using various combinations of pre-treatment and membrane module empirically or through trial and error, long-term operation for from a minimum of approximately one month to a maximum of approximately one year including seasonal variations is carried out in advance by actually passing the liquid to be treated through the membrane module, and it is tested through trial and error what is the maximum value of the flux that can be obtained stably. For example, in Non-Patent Document 1 (Advanced Aqua Clean Technology for 21$^{st}$ Century (ACT 21) New Development of City Water Membrane Filtration Technology, published by the Japan Water Research Center, December 2002, pages 200-204, 227-230, 257-271, 272-274, 277-279), various similar test results are reported, including a report of results of tests in which the long-term stability of a membrane water purification treatment system was investigated while testing various types of pre-treatment using an ultrafiltration (UF) membrane at Gifu Prefecture Yamanouchi Water Purification Plant.

Alternatively, in the case that such a long time cannot be taken for testing, it has been the case that empirical values for past membrane filtration plants for which the composition of the liquid to be treated is thought to be relatively similar are consulted, and thus the stable state flux value for the new membrane filtration plant is assumed empirically, and then a safety factor larger than usual is applied thereto so as to obtain the design value.

DISCLOSURE OF INVENTION

It is an object of the present invention to provide a method of estimating the maximum value of the flux during long-term stable operation including short-term cleaning of a membrane filtration plant based on measured data of a membrane filtration characteristic during initial membrane filtration.

The present invention is method of estimating a maximum flux during stable operation of a membrane filtration plant for which a membrane module and operating conditions have been specified, the estimating method comprising: a step of obtaining a measured value A of an initial membrane filtration characteristic for the membrane filtration plant using a liquid to be treated in and a membrane of a membrane module of the membrane filtration plant; a step of obtaining a maximum flux value during stable operation of each of a plurality of existing membrane filtration plants having a membrane module and operating conditions the same as or similar to the aforementioned membrane module and operating conditions; a step of obtaining a measured value B of the initial membrane filtration characteristic for each of the existing membrane filtration plants using a liquid to be treated in and a membrane of a membrane module of that one of the existing membrane filtration plants; and an estimating step of estimating a maximum flux for the aforementioned membrane filtration plant from the measured value A based on a relationship between the maximum flux values and the measured values B for the existing membrane filtration plants.

Here, the estimating step is preferably a step of representing by a formula or on a graph a relationship between the logarithm of the measured values B of the initial membrane filtration characteristic and the maximum flux values, and estimating the maximum flux for the membrane filtration plant by extrapolating or interpolating for the measured value A using the formula or graph.

Moreover, the operating conditions preferably comprise at least filtration time or membrane cleaning pattern conditions. Furthermore, the initial membrane filtration characteristic is preferably selected from the group consisting of a constant pressure simple filtration resistance, a quantitative simple filtration resistance, a cleaning-included constant pressure filtration resistance, and a cleaning-included quantitative filtration resistance. Moreover, the measured values of the initial membrane filtration characteristic, and the empirical values of the maximum flux during stable operation are preferably linked to one another by through a semi-log graph with the measured values on the log side.

ADVANTAGEOUS EFFECTS OF THE INVENTION

It becomes possible to estimate the maximum value of the flux during long-term stable operation including cleaning conditions of a membrane filtration plant very simply from liquid flow data for a short initial membrane filtration period. As a result, there is no longer any need to carry out long-term test operation when designing a new membrane filtration plant.

BEST MODE FOR CARRYING OUT THE INVENTION

Figure 1:
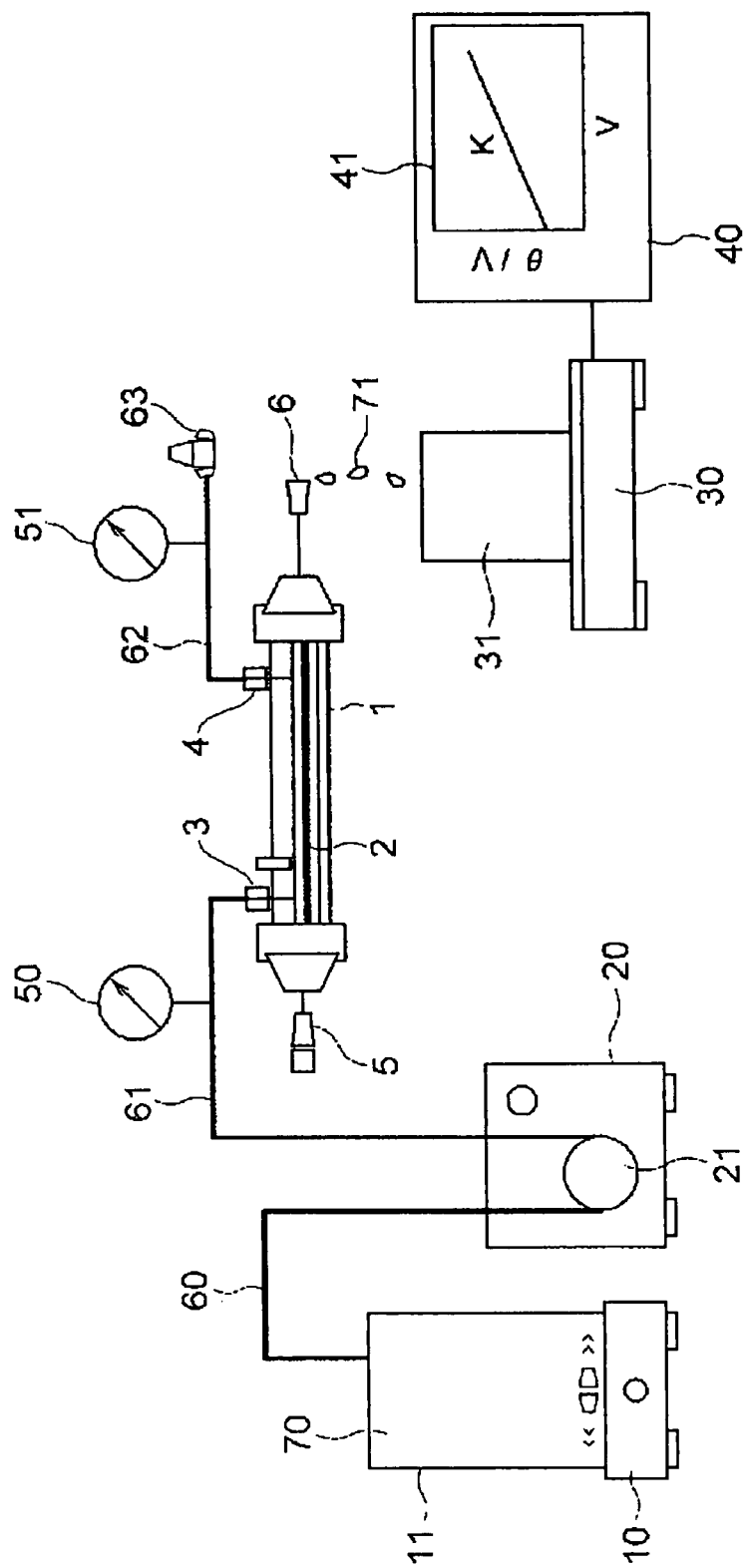
FIG. 1 is a schematic drawing showing schematically an example of the construction of an apparatus for measuring an initial membrane filtration characteristic.

Following is a description of embodiments of the present invention with reference to the drawings. In the present invention, first, the membrane module and operating conditions for a membrane filtration plant to be newly established are determined. Then, using a membrane to be used in the membrane module, and a liquid planned to be treated using the new membrane filtration plant, an initial membrane filtration characteristic such as the filtration resistance of the membrane (this value is taken as a measured value A) is measured. The measurement is completed in a short time of approximately 10 minutes to 1 hour.

Next, at least two existing membrane filtration plants with a membrane module and operating conditions the same as or similar to those of the membrane filtration plant to be newly established are selected, and empirical data on the maximum value of the flux at which operation can be carried out stably within an operating time range up to planned chemical cleaning is gathered. Such empirical values are gathered through trial and error by changing operating conditions such as the operating pressure in each plant. Moreover, using a membrane of the membrane module used in each of the existing membrane filtration plants and the liquid to be treated in that existing membrane filtration plant, the same initial membrane filtration characteristic as above is measured (each such value is taken as a measured value B).

Next, the empirical values of the maximum value of the flux for each of the existing membrane filtration plants, and the measured values B are plotted on a semi-log graph with the measured values B on the log side. The points are then joined by a straight line, and the point corresponding to the measured value A on this straight line is identified. If the flux value at this point is read off, then the maximum value of the flux at which operation can be carried out stably for the membrane filtration plant to be newly established can be obtained.

That is, surprisingly, regardless of what the liquid to be treated is, so long as there is data on the maximum value of the flux for each of a plurality of existing membrane filtration plants each having the same or similar membrane module and operating conditions, then by measuring the initial membrane filtration characteristic for the membrane of each of the existing membrane filtration plants and the initial membrane filtration characteristic for the membrane of the membrane filtration plant to be newly established, the maximum stable flux value for the membrane filtration plant to be newly established can be estimated forthwith.

Note that in the above, for convenience of explanation, the various steps of the estimating method according to the present invention have been described in the order measured value A, measured values B, maximum flux values, but the estimating method according to the present invention is not necessarily limited to this order. For example, the above may be determined in the order measured value A, maximum flux values, measured values B, or even the order maximum flux values, measured values B, measured value A.

The present invention was accomplished upon discovering, while carrying out various data analysis by trial and error based on empirical values for numerous existing membrane filtration plants constructed for various types of liquids to be treated, that if the above semi-log graph is plotted, then surprisingly, regardless of the nature of the liquids to be treated, the data for the various existing membrane filtration plants lies substantially on a single straight line for which the membrane module and operating conditions are specified.

As a result, it has become possible to carry out estimation of design conditions for a new membrane filtration plant very easily and in a short time and moreover highly accurately, whereas conventionally this has required long-term test operation for from one month at the shortest to approximately one year in general. Following is a more detailed description.

First, the new membrane filtration plant referred to here means a membrane filtration plant that is at the planning stage but has not yet been constructed, although this may also be an existing membrane filtration plant, i.e. a membrane filtration plant that has been constructed without long-term testing having been carried out in advance but rather with design values having been assumed based on data for another existing membrane filtration plant for which the nature of the liquid to be treated is similar, or a plant for which the work of finding out the maximum flux empirically has not been carried out. With such a plant, there is a possibility that optimal design has not been necessarily been carried out, and hence estimating the maximum value of the flux is worthwhile.

Next, the membrane module and operating conditions to be used in the new membrane filtration plant are specified. This is because these are parameters that specify different straight lines when the semi-log graph described above is created. Here, the type of the membrane module is, as a rule, judged by the material of the membranes, the form of the membranes such as whether the membranes are hollow fibers or flat membranes, the diameter of the pores, the number of pores, in the case of hollow fibers the diameter of the fibers, the length of the fibers, the packing ratio of the fibers in the module, in the case of flat membranes the dimensions of the membranes, the distance between membranes, and the form of the module such as whether the module is spiral type, filter press type or the like, and so on. In the case that the above differ, the performance of the membrane module differs, and hence as a rule a different membrane module is specified.

In actual practice, carrying out the judgment in accordance with the product classification of the membrane module is simple and thus preferable. That is, judging products of the same grade as being the same membrane module, and products of different grades as being different membrane modules is simple. This is because it is considered that if different grade numbers have been assigned, then membrane modules have different specifications and performance to one another. In the case that more than one grade is assigned to one product, the judgment is preferably carried out by returning to the above principles. Moreover, membrane modules being "similar" means that to a certain specified membrane module, the various specifications and characteristics described above are close, and hence the membrane modules can be used as alternatives for one another. A characteristic being "close" means that even if numerical values of the characteristic differ, the numerical values are within a range of ±30%. Within this range, characteristics are judged as being similar or substantially the same operating condition. More preferably, the numerical values are within ±20%, yet more preferably ±10%.

Moreover, operating conditions mean the filtration time comprising the sum of, in actual operation, (i) the time for the filtration process in which the liquid to be treated is treated, (ii) the time for a cleaning process in which the membranes are cleaned, and (iii) the time for a flushing process in which a turbid component is flushed out as required (i.e. the time required for carrying out a repeat unit process in actual operation), a membrane cleaning pattern comprising, for example, the form of the membrane cleaning, the air flow rate in the case of using air scrubbing in the membrane cleaning, and the backwashing time, and so on. In the case that these are the same, it is judged that the operating conditions are the same. Moreover, even if the numerical values thereof differ, so long as the numerical values are within a range of ±30%, the operating conditions are judged to be similar or within a range of being substantially the same. More preferably, the numerical values are within ±20%, yet more preferably ±10%. Note that pretreatment conditions need not be included in the operating conditions. This is because, although the nature of the liquid to be treated is changed by such pre-treatment, the present invention can be applied regardless of the nature of the liquid to be treated.

Next, using a membrane of the membrane module to be used in the new membrane filtration plant, and the liquid to be treated in the new membrane filtration plant, the measured value A of an initial membrane filtration characteristic of the membrane is measured. Here, "initial membrane filtration characteristic" means a membrane characteristic within a time period from treatment of the liquid to be treated being started using a new unused filtration membrane up to a stable state being reached as shown in FIG. 1, but in actual practice, it is sufficient to measure the membrane characteristic over a time interval of from approximately 10 minutes from the treatment being started up to at the longest a time including approximately 2 to 3 cleaning steps. Examples of the item measured as the initial membrane filtration characteristic are the constant pressure simple filtration resistance, the quantitative simple filtration resistance, the cleaning-included constant pressure filtration resistance, the cleaning-included quantitative filtration resistance, and so on; in the following, the case that the constant pressure simple filtration resistance is used as the initial membrane filtration characteristic is described. Description will be given for other initial membrane filtration characteristics later.

FIG. 1 is a schematic drawing of an apparatus for measuring the initial membrane filtration characteristic. A membrane module, which is central to the apparatus, is a mini-module 1 in which a single hollow fiber 2 of length approximately 20 cm is housed in a housing. As the hollow fiber 2, there is used an unused hollow fiber the same as a hollow fiber to be used in the membrane module planned to be used in the new membrane filtration plant, although the length of the hollow fiber is made to match the housing. One end of the hollow fiber 2 is closed off by a stopper 5, and the other end is made to be an open end 6 such that liquid that has permeated through the membrane can flow out. The liquid to be treated enters into the housing from an inlet 3 on the side of the mini-module, and only liquid that permeates through the membrane flows out from the open end 6. An outlet 4 on the side of the mini-module leads to a closed off end 63 via a line 62.

The liquid 70 to be treated in the new membrane filtration plant, which is in a vessel 11, is sucked in from the vessel 11 via a line 60 by an extruding roller 21 of a pump 20 while being stirred by a stirrer 10, and is fed to the inlet 3 on the side of the mini-module via a line 61. A filtration pressure is applied to the mini-module 1 through rotation of the pump 20. Pressure gauges 50 and 51 are provided in the line 61 and the line 62 respectively, and so long as the measurement is being carried out normally, the pressures indicated by the two pressure gauges are substantially the same value.

A vessel 31 for receiving membrane-permeated liquid 71 flowing out from the open end 6 of the mini-module 1 is placed below the open end 6. The vessel 31 is further placed on an electronic balance 30 capable of sequentially measuring the weight of the membrane-permeated liquid 71 for each vessel 31. Cumulative data on the weight measured by the electronic balance 30 is sent to a computer 40 and subjected to data processing, whereby the constant pressure simple filtration resistance K is computed.

Here, the constant pressure simple filtration resistance K will now be described. K is also known as the Ruth constant pressure filtration coefficient, being a coefficient obtained from studying cake filtration under a condition of constant pressure filtration. Taking the filtration time from starting filtration as $\theta$, and the amount of filtrate as V, K is defined as the gradient $\theta/V^2$ of a straight line obtained by plotting a graph of $\theta/V$ on the vertical axis against V on the horizontal axis on ordinary graph paper. This graph of $\theta/V$ on the vertical axis against V on the horizontal axis is shown on the computer 40 portion in FIG. 1. A program for computing K is stored in the computer 40. When determining K, so that the pressure gauges 50 and 51 are at constant pressure, the measurement is preferably carried out under the condition of the rotational speed of the roller 21 being constant. The measurement of the constant pressure simple filtration resistance can easily be completed within approximately 10 minutes. The measured value A of the constant pressure simple filtration resistance K using the membrane and the liquid to be treated to be used in the membrane module of the new membrane filtration plant is thus obtained.

Note that any of various modifications may be made to the apparatus for measuring the initial membrane filtration characteristic, the apparatus not being limited to that shown in FIG. 1. For example, there is no limitation to one hollow fiber being housed in the mini-module, but rather a mini-module with a flat membrane may be used instead. Moreover, the measurement may instead be carried out by making the flow rate constant and measuring the variation in pressure.

Next, from out of existing membrane filtration plants, a plurality of ones each having a membrane module and operating conditions the same as or similar to those of the new membrane filtration plant are selected (in actual practice, the membrane module and operating conditions for the new membrane filtration plant are selected by consulting the membrane module and operating conditions for the existing membrane filtration plants). When selecting the existing membrane filtration plants, there is no need for the nature of the liquid to be treated to be similar to for the liquid to be treated in the new membrane filtration plant.

Next, data on the maximum value of the flux in a stable state as measured by trial and error is gathered for each of the plurality of existing membrane filtration plants. In general, with an existing membrane filtration plant, the flux is changed by varying the filtration pressure as appropriate so as to optimize the operating conditions for a while after starting operation, and then operation is carried out in this state for a certain time period, and the behavior over time of the filtration pressure is studied. Examples of situations in which this was carried out are shown in Tables 2 to 4.

Figure 2:
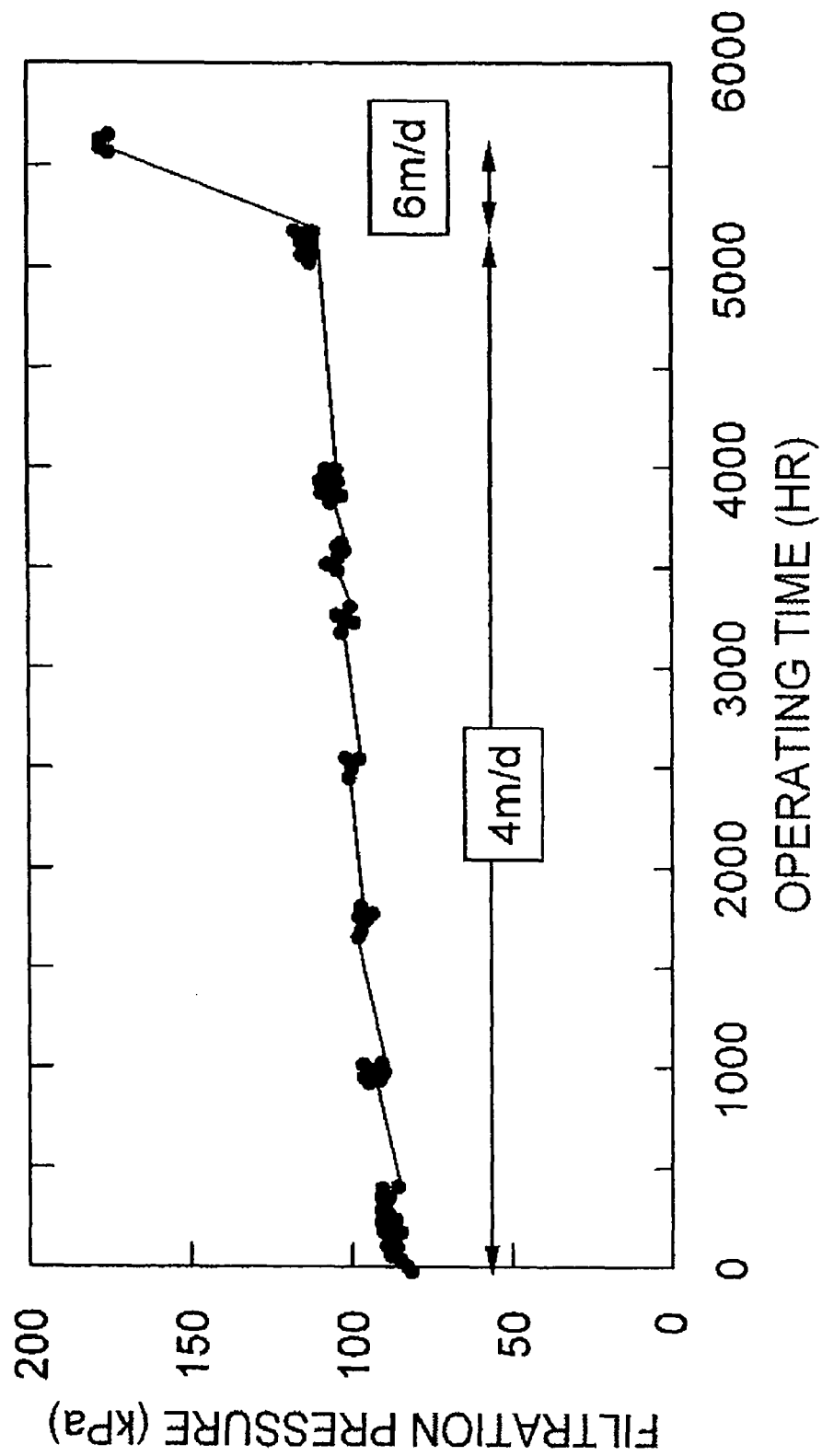
FIG. 2 is a diagram showing an example of experimental results for determining the maximum value of the flux in a stable state for an existing membrane filtration plant (A)

FIG. 2 shows results of an experiment in which the flux was increased in stages for a certain existing membrane filtration plant (A), carried out with the purpose of determining at up to what flux the filtration pressure could be maintained in a stable state, i.e. the maximum value of the flux in a stable state. Here, the flux is the volume of membrane-permeated liquid obtained per unit area of the membrane per day, $m^3/m^2/d=m/d$ being used as the units thereof. In an initial period of the experiment, it was started from a small flux of 4 m/d, and it was ascertained that a stable state was obtained in this case. The flux was thus next increased to 6 m/d, whereupon the gradient of the pressure increase was too high, and hence it was ascertained that stable operation was not possible. It can be seen from this that at 6 m/d, the maximum value of the flux at which a stable state can be obtained has been exceeded. In actual fact, through subsequent tests, it was ascertained that the maximum value of the flux is 4.7 m/d.

Figure 3:
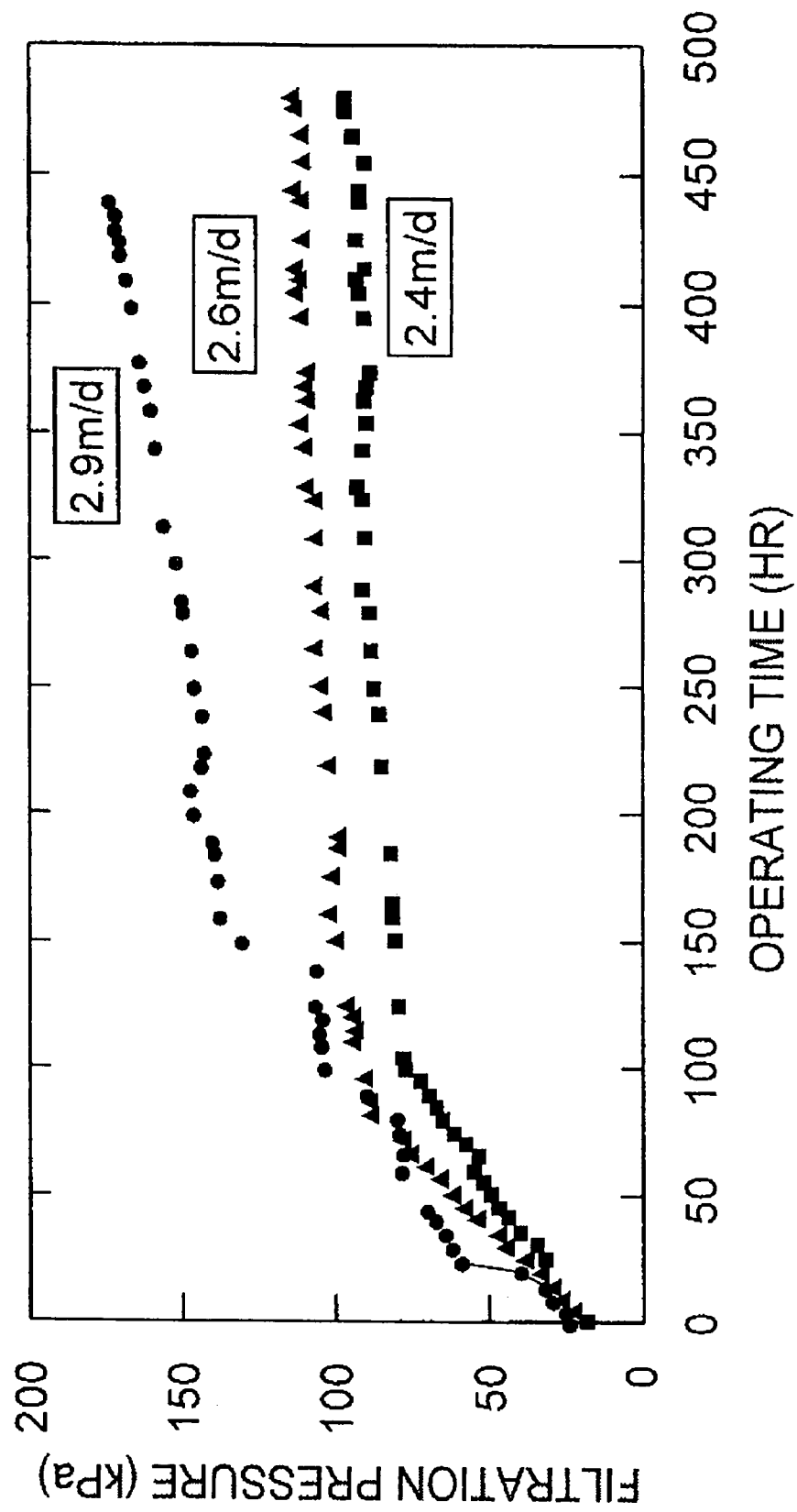
FIG. 3 is a diagram showing an example of experimental results for determining the maximum value of the flux in a stable state for an existing membrane filtration plant (B)

FIG. 3 shows the results of an experiment for determining the maximum stable flux value for another existing membrane filtration plant (B). Operation was carried out at 2.9 m/d initially, whereupon the gradient of the pressure increase was too high, it being ascertained that 200 kPa, which is the upper limit of the operating pressure for the plant, was exceeded before completing an operating time period up to planned chemical cleaning. That is, a stable state was not obtained. The membrane was thus then subjected to chemical cleaning so as to return the membrane to a state like that of a new article, and operation was carried out again with the flux reduced to 2.4 m/d, whereupon it was ascertained that a stable state with a small pressure increase gradient could be obtained. Next, the membrane was again subjected to chemical cleaning so as to return the membrane to a state like that of a new article, and operation was carried out with the flux increased to 2.6 m/d, whereupon it was ascertained that a stable state could be obtained even at this flux. Furthermore, from the results of experiments, not shown, in which the flux was adjusted more finely between 2.6 m/d and 2.9 m/d, it was verified that the maximum value of the flux for the existing membrane filtration plant (B) is 2.7 m/d.

Figure 4:
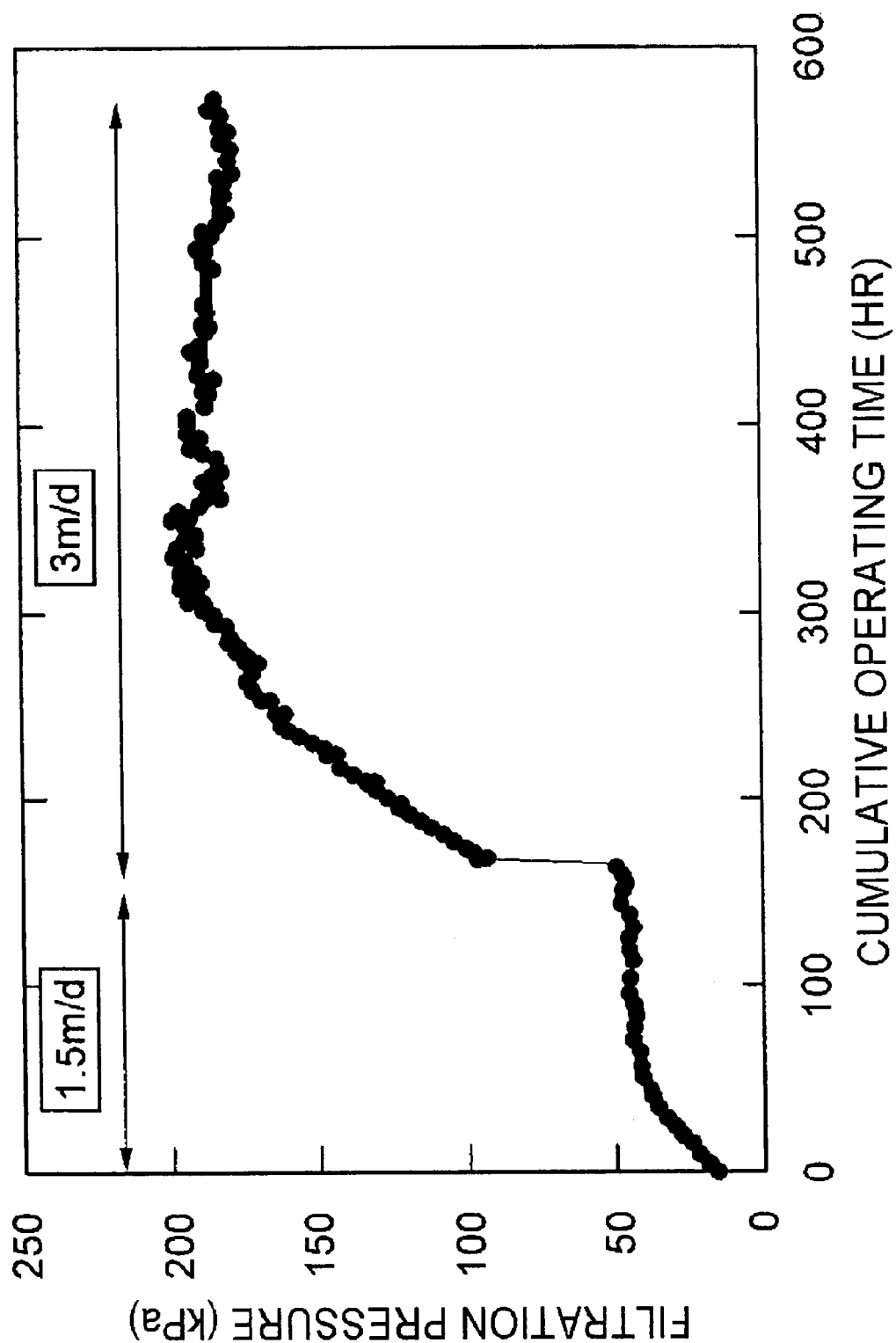
FIG. 4 is a diagram showing an example of experimental results for determining the maximum value of the flux in a stable state for an existing membrane filtration plant (C)

FIG. 4 shows the results of an experiment for determining the maximum value of the flux in a stable state for yet another existing membrane filtration plant (C). First, operation was carried out under the condition of a flux of 1.5 m/d, it being ascertained that a stable state could be obtained in this case. Next, the flux was increased to 3 m/d, whereupon the filtration pressure increased rapidly, 200 kPa, which is the upper limit of the pressure for operation of the plant, being exceeded at times. That is, a stable state was not obtained. From subsequent experiments, not shown, divided into finer stages, it was verified that the maximum value of the flux at which a stable state can be obtained for this membrane filtration plant is 2.8 m/d.

That is, the maximum stable flux value is determined empirically in stages through trial and error, i.e. first filtration operation is carried out for a certain time period at a flux value assumed to be on the stable side, the extent of the pressure increase is investigated, and it is judged whether or not a pressure increase gradient within a desired range is obtained; in the case that a desired gradient is obtained, this is taken as a stable state, and then the flux is further changed and it is judged whether or not a stable state is obtained. In this way, data on the maximum value of the flux in a stable state measured individually for each of the existing membrane filtration plants is gathered (in actual practice, from out of existing membrane filtration plants for which such data has been assembled, a plurality of existing membrane filtration plants that can be consulted when setting the conditions for the new membrane filtration plant are selected).

Next, using a membrane of the membrane module used in one of the existing membrane filtration plants, and the liquid to be treated in that existing membrane filtration plant, the constant pressure simple filtration resistance K is measured as described above with reference to FIG. 1. The membrane used is a membrane having the same specification characteristics (or the same grade) as a membrane housed in the membrane module used in the existing membrane filtration plant, but being an unused membrane. Note that there is no need for the length of the membrane or the number of such membranes to be the same. For each of the remaining existing membrane filtration plants out of the plurality selected, the constant pressure simple filtration resistance K is similarly measured using the liquid to be treated in that plant, and an unused membrane having the same specification characteristics as a membrane housed in the membrane module of that plant. The plurality of measured values thus obtained are taken as the measured values B. As in the case of the new membrane filtration plant described above, this measurement can be completed in at most approximately 10 minutes for each of the membranes. Note that the measured value of the initial membrane filtration characteristic is intrinsic to each plant, and hence in the case that the measured value B has already been obtained, this measured value may be used.

Next, the maximum value of the flux in a stable state is estimated for the new membrane filtration plant from the data obtained as described above. First, the plurality of measured values B of K, and the maximum values of the flux in a stable state, for the existing membrane filtration plants obtained as described above are plotted on a semi-log graph, the K values being on the log side. Next, a straight line passing through the plotted points is drawn. As already described, it has been discovered that, regardless of the nature of the liquid to be treated, if the membrane module and operating conditions are specified, then even if the points have been measured for different membrane filtration plants, the points all lie on the same straight line. That is, it can be estimated that a point also exists on this straight line for the new membrane filtration plant.

Accordingly, if the measured value A of K for the new membrane filtration plant obtained as described above is plotted on the straight line, and the value of the membrane filtration flux is read off from the vertical axis, then this value can be estimated as being the maximum value of the flux at which a stable state can be obtained for the new membrane filtration plant in question. That is, estimation of the stable state for the new membrane filtration plant can be carried out by extrapolating or interpolating from the data for the existing membrane filtration plants.

In this way, based on empirical values for existing membrane filtration plants, and an initial membrane characteristic that can easily be measured, regardless of any difference in the nature of the liquid to be treated, the desired maximum flux value can be obtained highly accurately. There is thus no longer any need for long-term test operation which has been necessary for new membrane filtration plants hitherto, or for test operation through trial and error for determining the maximum value of the flux after the plant has been constructed.

Conversely, if the initial membrane filtration characteristic of membranes used in each of various membrane modules is measured with the liquid to be treated in the new membrane filtration plant, then it can be identified in advance the membrane module and operating conditions like which existing membrane filtration plant to use so as to obtain the highest flux in the new membrane filtration plant, i.e. the optimum conditions.

That is, if a database having stored therein data on the initial membrane filtration characteristic and the maximum flux value for existing membrane filtration plants under various conditions is created, then merely by measuring the initial membrane filtration characteristic for each of various membranes using the liquid to be treated in the new membrane filtration plant, the optimum membrane module and operating conditions for the new membrane filtration plant can be determined forthwith.

Next, as initial membrane filtration characteristics that can be used, other than the simple filtration resistance K described above, examples include the quantitative simple filtration resistance, the cleaning-included constant pressure filtration resistance, and the cleaning-included quantitative filtration resistance. Note, however, that the initial membrane filtration characteristic is not limited thereto, but rather may be any parameter enabling an initial membrane characteristic to be identified.

Figure 5:
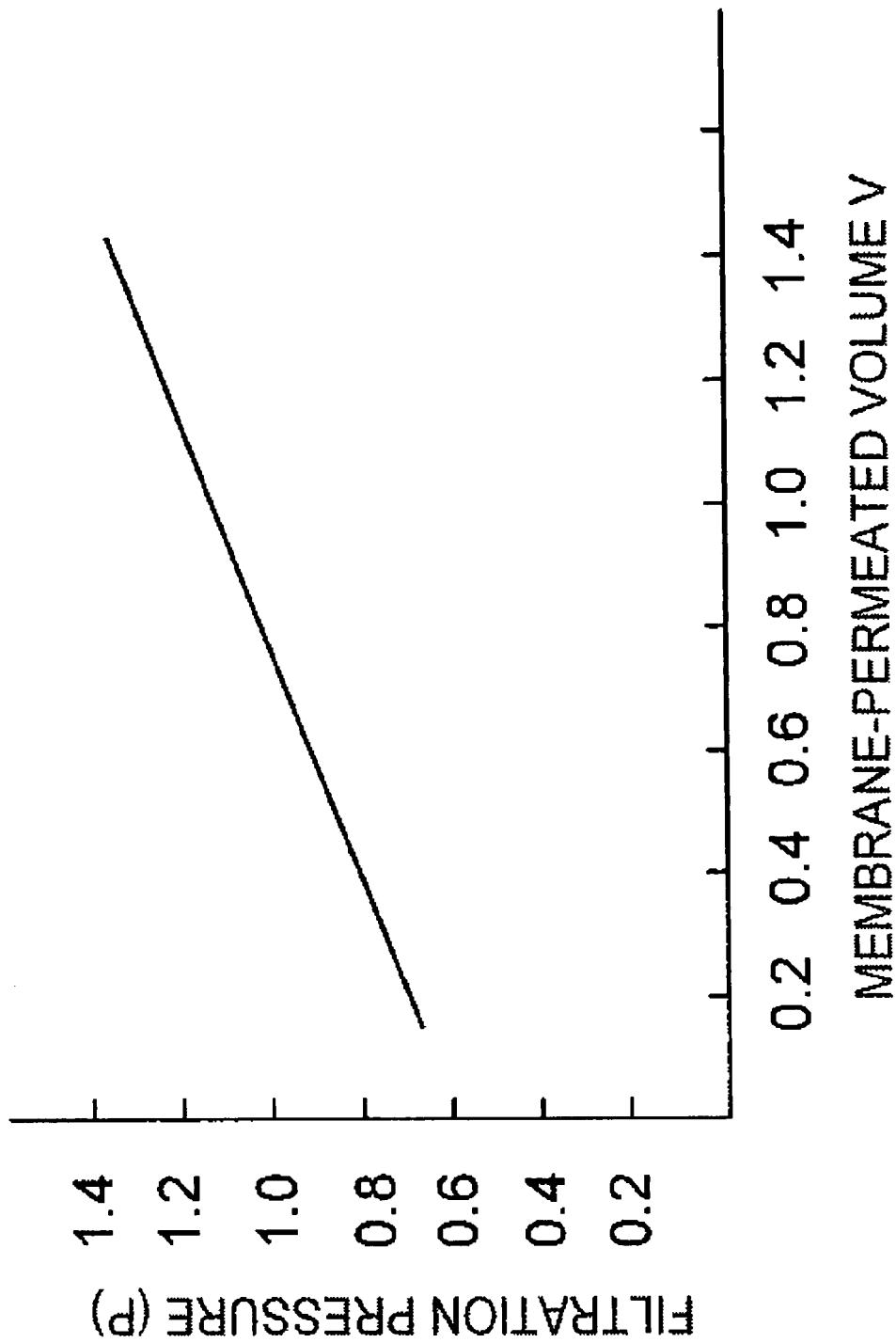
FIG. 5 is a diagram showing an example of a graph for determining a quantitative simple filtration resistance.

For example, the quantitative simple filtration resistance is defined, from the variation over time in the membrane-permeated amount and the operating pressure as measured using an apparatus as in FIG. 1 under the condition of constant flow rate, as the gradient of a straight line obtained in the case of plotting the cumulative value V of the membrane-permeated volume (which corresponds to the time) on the horizontal axis and the operating pressure P on the vertical axis on a graph on ordinary graph paper. This is shown in FIG. 5. This quantitative simple filtration resistance is practical from the viewpoint that a membrane filtration plant is operated under quantitative operating conditions in actual practice. However, on the other hand, the apparatus for measuring the initial membrane filtration characteristic becomes complex since there arises a need to control operation of the pump through signals from the pressure gauges.

Figure 6:
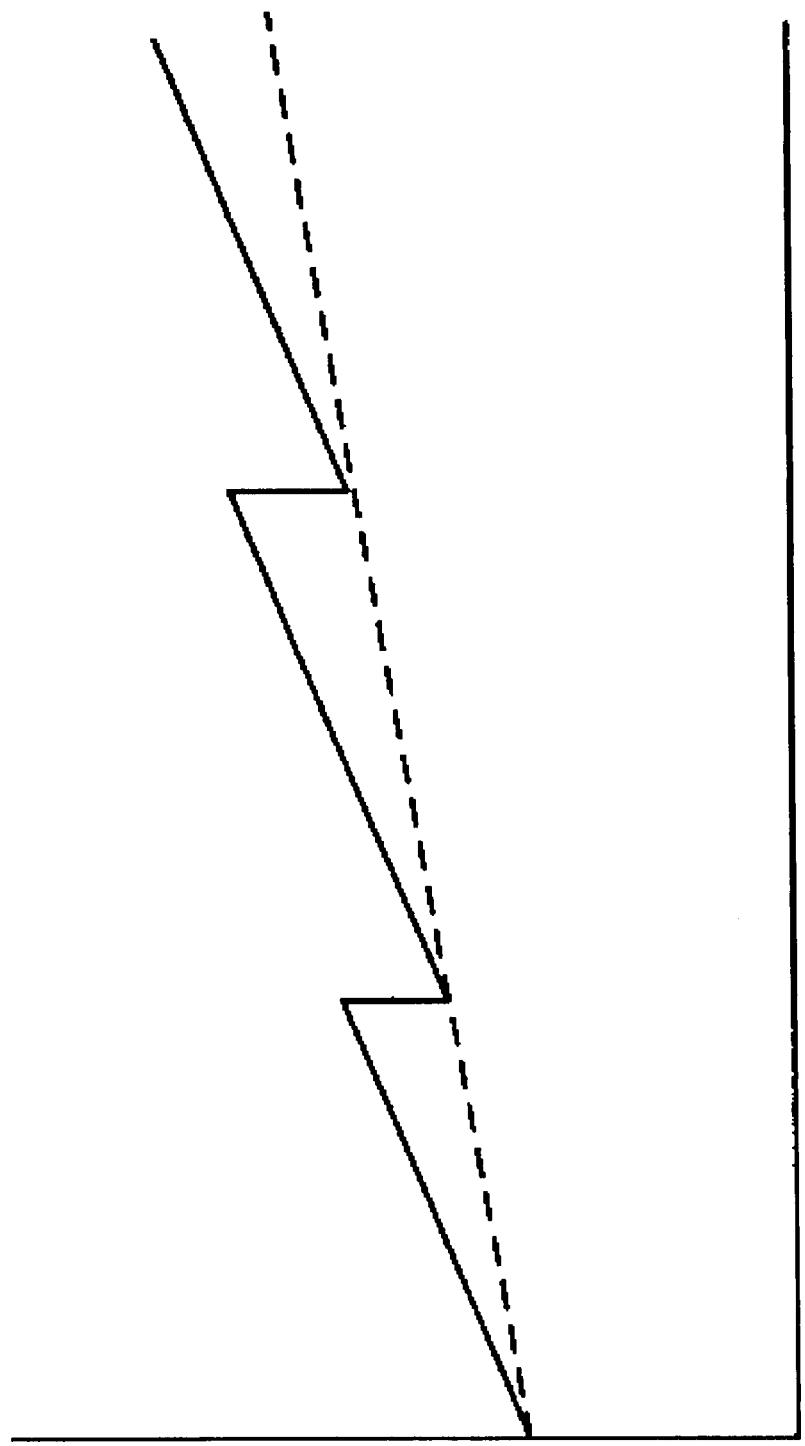
FIG. 6 is a diagram showing the concept of a cleaning-included constant pressure filtration resistance.

Moreover, as the initial membrane filtration characteristic, there can also be used one including up to approximately two to three cleaning steps, although the measurement becomes more complex. K under the condition of constant pressure with cleaning conditions added is referred to as the cleaning-included constant pressure filtration resistance. This is shown in FIG. 6. The solid line is the actual measurement data, it being possible to use the gradient of the straight line shown by the broken line as the initial membrane filtration characteristic.

Figure 7:
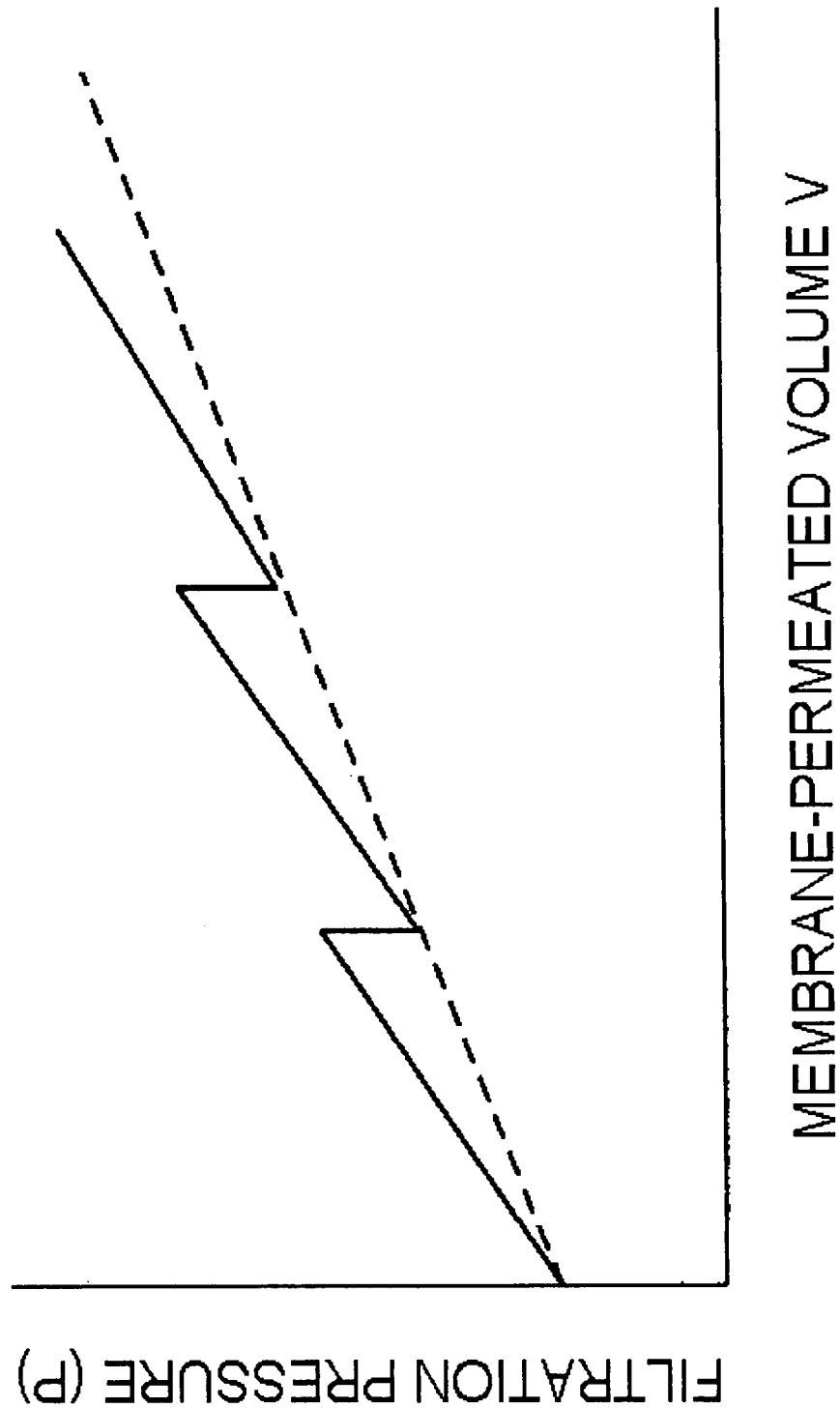
FIG. 7 is a diagram showing the concept of a cleaning-included quantitative filtration resistance.

Similarly, when measuring the quantitative simple filtration resistance, that with the addition of up to approximately two to three cleaning steps can also be used. This resistance under the quantitative condition with cleaning conditions added is referred to as the cleaning-included quantitative filtration resistance. This is shown in FIG. 7. The solid line is the actual measurement data including the cleaning, it being possible to use the gradient of the straight line shown by the broken line as the initial membrane filtration characteristic.

Furthermore, regarding the temperature during operation, it is preferable to establish in advance a standard reference temperature from the operating temperature for an existing membrane filtration plant, and handle the shift therefrom by conversion using the temperature variation of the viscosity of the liquid to be treated. Following is a more detailed description of the present invention through a working example; however, the scope of the present invention is not limited by this working example.

EXAMPLE 1

For a certain sand filtration facility for river water, before constructing a new membrane filtration plant for filtering wastewater during backwashing, the maximum stable flux value was estimated. The turbidity of the wastewater was relatively high at 100 degree. It was decided to select a hollow fiber type precise filtration membrane module made by Asahi Kasei Chemicals Corporation (model number UNA-620A, membrane area 50 $m^2$) as the membrane module, which was considered to be suitable from the required throughput and so on, and the stable operating time period up to chemical cleaning was set to 6 months. Moreover, a total of 30 minutes comprising 28.5 minutes of filtration operation, 1 minute of air scrubbing with backwashing, and 30 seconds of flushing was taken as a unit process, this constituting standard operating conditions, and operation was carried out by repeating this unit process. During the air scrubbing with backwashing, sodium hypochlorite was added to a concentration of 1 to 5 mg/l to the filtrate water used in the backwashing. Using an unused membrane to be used in the membrane module, the apparatus shown in FIG. 1, and the wastewater for when carrying out the backwashing in the sand filtration, the constant pressure simple filtration resistance K of the membrane was measured. The measured value was relatively high at 0.35. This was taken as the measured value A.

Next, three plants were selected that used a membrane module having the same model number as the membrane module selected above and the same operating conditions. One was the membrane filtration plant (A) for which some of the experimental results were shown in FIG. 2, being a plant that carries out filtration of river water of turbidity 0.03 degree. Using an unused membrane the same as a membrane used in the membrane module of the membrane filtration plant (A), and the river water treated by the membrane filtration plant (A), the constant pressure simple filtration resistance K was measured at a temperature of 20° C. using the apparatus of FIG. 1, being 0.00033. This was taken as one of the measured values B.

The second plant was the membrane filtration plant (B) for which some of the experimental results were shown in FIG. 3, being a plant that carries out filtration of industrial water of turbidity 1 degree. The membrane module and operating conditions used in this membrane filtration plant (B) were the same as for the membrane filtration plant (A). Using the industrial water and membrane for the membrane filtration plant (B), the constant pressure simple filtration resistance K was again measured using the apparatus of FIG. 1, being 0.022. This was taken as the second one of the measured values B.

The third plant was the membrane filtration plant (C) for which some of the experimental results were shown in FIG. 4, being a plant that carries out filtration of river water that has been made to have a turbidity of 0.14 through the addition of pre-treatment comprising coagulating sedimentation and sand filtration on the raw water. The membrane module and operating conditions used in this membrane filtration plant (C) were the same as for the membrane filtration plant (A). Using the pre-treated water and membrane for the membrane filtration plant (C), the constant pressure simple filtration resistance K was again measured using the apparatus of FIG. 1, being 0.0187. This was taken as the third one of the measured values B.

Next, the maximum stable flux value, which had been previously identified, and the constant pressure simple filtration resistance K for each of the membrane filtration plants (A) to (C) are shown in Table 1.

TABLE 1

| K value | Membrane filtration flux (m/d) |
| --- | --- |
| 0.00033 | 4.7 |
| 0.022 | 2.7 |
| 0.0187 | 2.8 |

Figure 8:
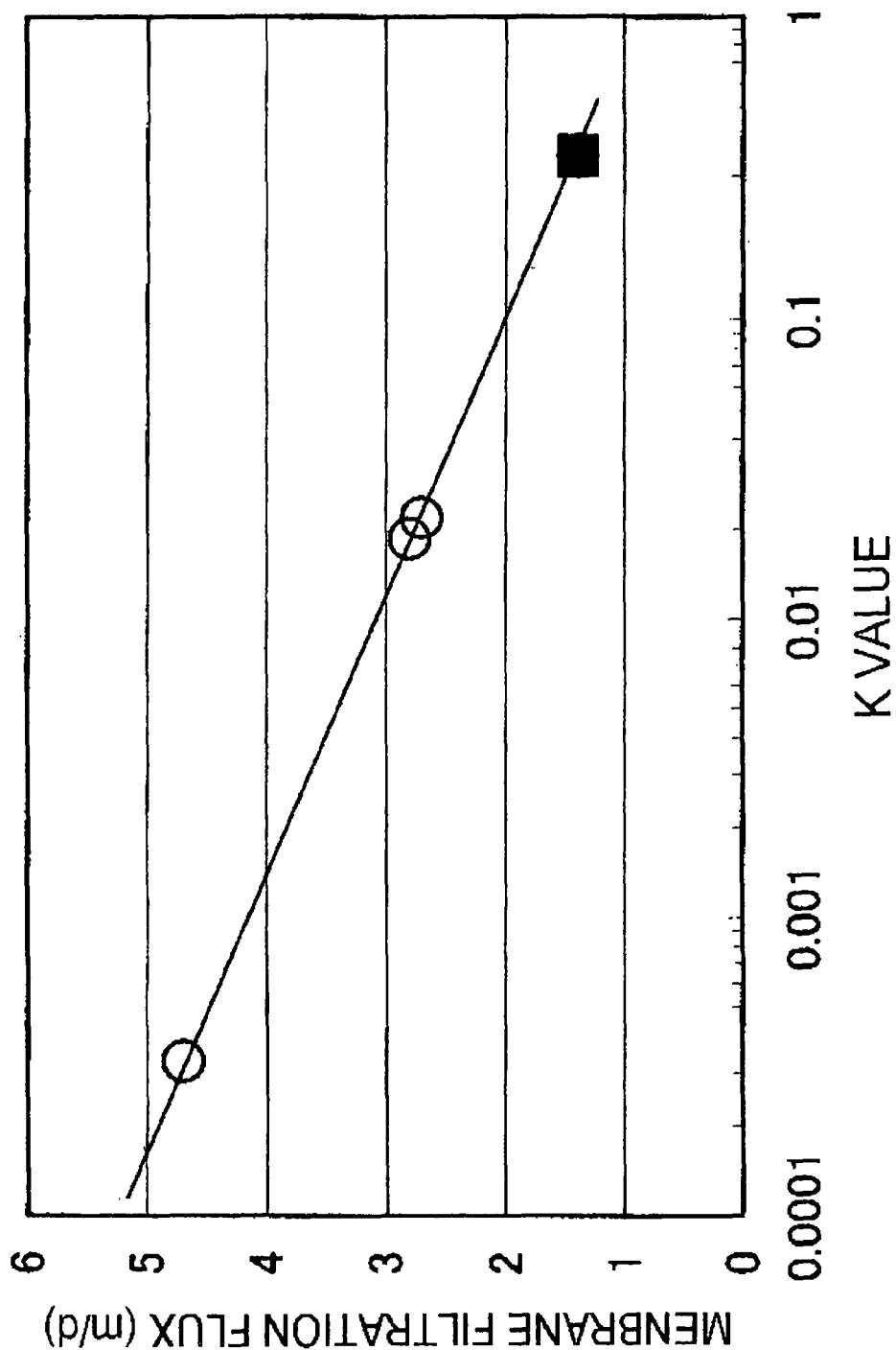
FIG. 8 is a diagram showing an example of the relationship between a K value and the maximum value of the flux in a stable state.

A graph of these values plotted as white circles (o) on a semi-log graph with the constant pressure simple filtration resistance on the log side is shown in FIG. 8. It can be seen that, as a result, the three points lie on a single straight line as shown in FIG. 8. The point for the measured value A described above (K value=0.3500) is plotted on the straight line as a black square (■), and reading off the flux value at this point gives 1.4 m/d. This is the estimated value of the maximum stable flux value.

Figure 9:
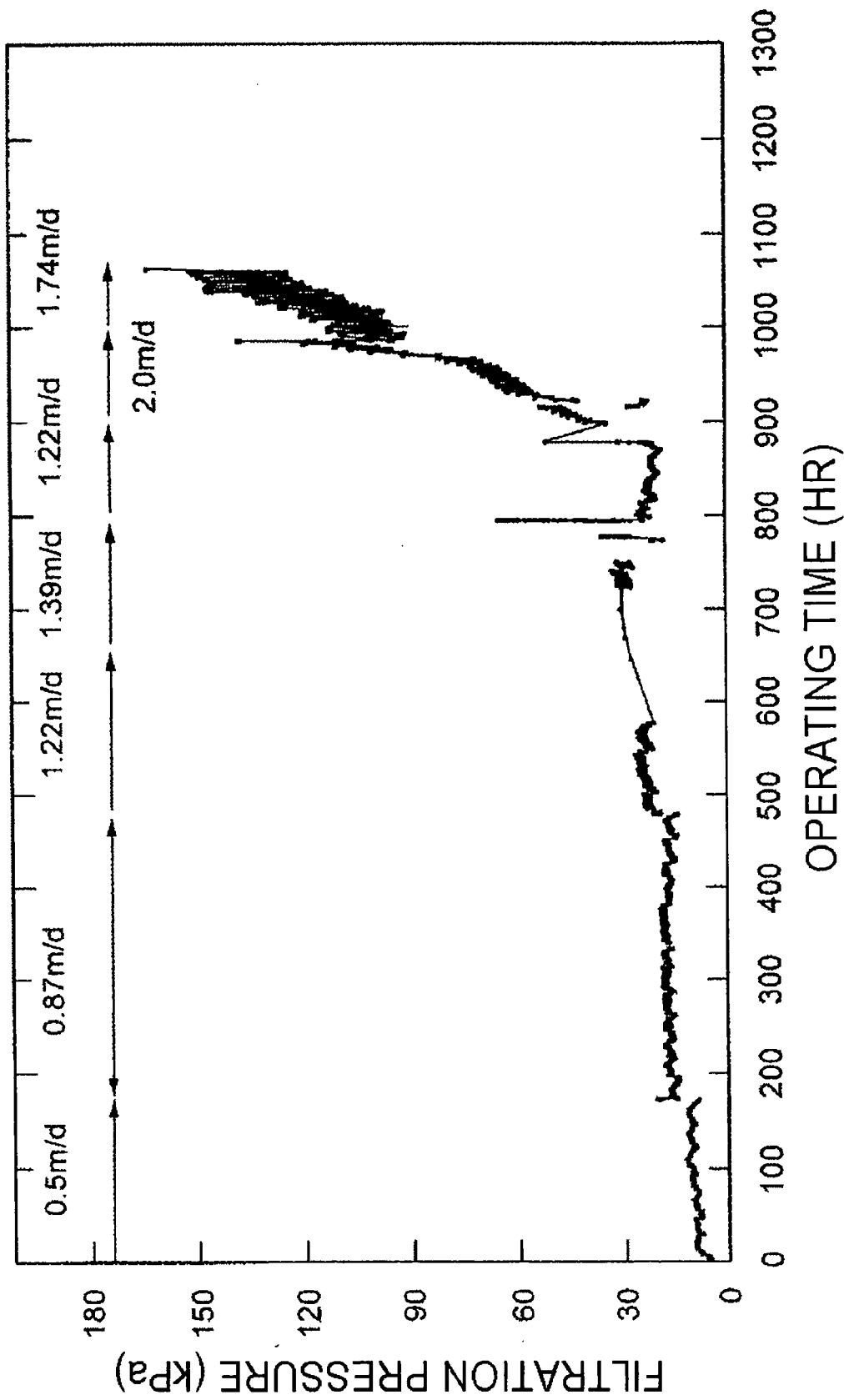
FIG. 9 is a diagram showing an example of experimental results for determining the maximum value of the flux in a stable state for a new membrane filtration plant.
Figure 10:
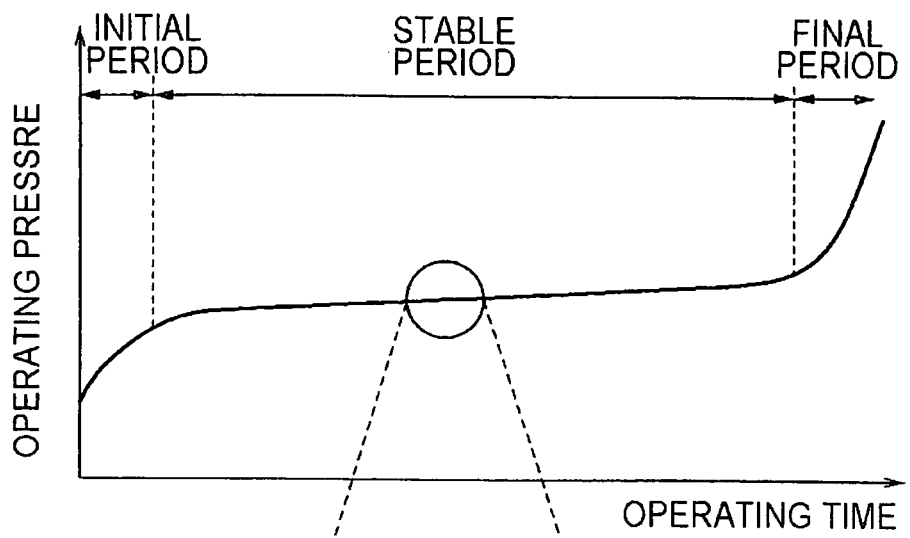
FIG. 10 are diagrams showing an example of the typical behavior of the operating pressure for a membrane filtration plant.
Figure 10:
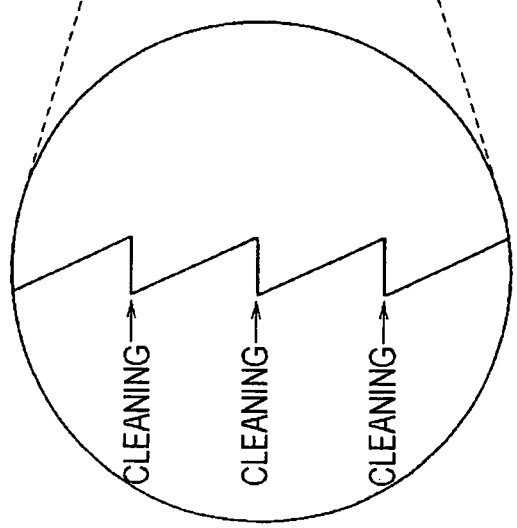

Next, after the new membrane filtration plant had been constructed based on the selected membrane module and operating conditions, while carrying out filtration operation on river water made to have a turbidity of 100 degree through the addition of pre-treatment, the flux was changed in steps, so as to measure the maximum stable flux value. An example of the behavior of the filtration pressure during the measurement is shown in FIG. 9. It can be seen that a stable state was obtained at up to 1.39 m/d, but at 1.74 m/d the pressure increase was too rapid and hence a stable state was not obtained. The measured value of the maximum stable flux value from more detailed experiments was 1.4 m/d, and hence it was possible to obtain a result that matched the estimated value well within the range of measurement error.

REFERENCE EXAMPLE 1

It was attempted to estimate the maximum value of the flux in a stable state using the SDI (silt density index)

measurement method. Using a precise filtration filter of pore size 0.45 μm (made by Millipore, trade name HAWP 47 mm φ) as a filter, the liquids to be treated in the membrane filtration plants (A), (B) and (C) in working example 1 were each subjected to filtration. As the filtration conditions, the filtration pressure was made to be fixed at 210 kPa, and the filtration flow rate measurement time interval was made to be 15 minutes. First, the time required to filter 500 ml of the liquid to be treated at the start of the filtration was measured. This was taken as t0. Next, the filtration was continued, and after the measurement time interval of 15 minutes had elapsed from the start of the filtration, the time required to filter 500 ml of the liquid to be treated was again measured. This was taken as t15. The SDI was calculated from these measured values and the following formula:

$$SDI(15 \text{ min}) = \frac{(1 - t_0/t_{15}) \times 100}{15}$$

The SDI in the case of using the liquid to be treated in the membrane filtration plant (A) was 0. Moreover, the SDI in the case of using the liquid to be treated in the membrane filtration plant (B) was 3.8. Furthermore, the SDI in the case of using the liquid to be treated in the membrane filtration plant (C) was 6.5. Even though the maximum stable flux values were close to one another for the membrane filtration plant (B) and the membrane filtration plant (C), the result was that the SDIs differed greatly. Moreover, using the liquid to be treated in the new membrane filtration plant of working example 1, the SDI was similarly measured, but membrane-permeated liquid could not be obtained because the turbidity was high. That is, the filtration flow rate was zero, and hence measurement was impossible.

According to the present invention, when designing a new membrane filtration plant, the maximum value of the flux during long-term stable operation including short-term cleaning of a membrane filtration plant can be easily estimated, without carrying out long-term test operation, from measured data of a membrane filtration characteristic during initial membrane filtration, which can be determined in a short time.

We claim:

1. A method of operating a membrane filtration plant for which a membrane module and operating conditions have been specified, the operating method comprising:
   a step of obtaining, by using a computer, a measured value A of an initial membrane filtration characteristic for said membrane filtration plant by making a liquid to be treated permeate through membrane of the membrane module of said membrane filtration plant, wherein said initial membrane filtration characteristic is a constant pressure simple filtration resistance,
      wherein in the constant pressure simple filtration resistance, a filtration time and a volume of the liquid which permeates the membrane from starting the filtration are measured at a constant pressure of the liquid before the liquid permeate through the membrane and a constant pressure of the liquid after the liquid permeate through the membrane and a ratio of the filtration time to a square of the volume of the liquid is obtained as the measured value A,
   a step of obtaining, by using a computer, a maximum flux value that maintains the filtration pressure at a stable condition during an operating time range up to chemical cleaning in a stable state of each of a plurality of existing membrane filtration plants having a membrane module and operating conditions the same as said membrane module and operating conditions and different from the membrane filtration plant for which the membrane module and operating conditions have been specified, by repeatedly verifying whether a filtration pressure is maintained in a stable condition at a constant flux until a chemical cleaning in a stable operation and increasing the constant flux in the case that the filtration pressure is maintained in the stable condition;
   a step of obtaining, by using a computer, a measured value B of the initial membrane filtration characteristic for each of said existing membrane filtration plants by making a liquid to be treated of the each of the existing membrane filtration plants permeate through membrane of the membrane module of the each of said existing membrane filtration plants, wherein in the each of the existing membrane filtration plants, a filtration time and a volume of the liquid which permeates the membrane from starting the filtration are measured at a constant pressure of the liquid before the liquid permeate through the membrane and a constant pressure of the liquid after the liquid permeate through the membrane and a ratio of the filtration time to a square of the volume of the liquid is obtained as the measured value B;
   a step of estimating, by using a computer, a maximum flux for said membrane filtration plant, wherein the maximum flux values and the measured values B for said existing membrane filtration plants are plotted on a semi-log plot graph with the measured values B on the log side, an approximated straight-line which shows a semi-log linear relationship between the maximum flux values and the measured values B is obtained from the graph, the measured value A is interpolated or extrapolated on the approximated straight-line, and a maximum flux value corresponding to the measured value A is read as the maximum flux value during stable operation of the membrane filtration plant; and
   a step of controlling the operating conditions of the membrane module of the membrane filtration plant in which the maximum flux estimated in the step of estimating is defined as a maximum of a flux value in the membrane filtration plant.

2. The method according to claim 1, characterized in that said operating conditions comprise at least filtration time or membrane cleaning pattern conditions, wherein the filtration time is the sum of, (i) a time for the filtration process in which the liquid to be treated is treated, (ii) a time for a cleaning process in which the membranes are cleaned, and (iii) a time for a flushing process in which a turbid component is flushed out as required, and the membrane cleaning pattern conditions is the air flow rate in the case of using air scrubbing in the membrane cleaning, and/or the backwashing time.

3. The estimating method according to claim 1, wherein the initial membrane filtration characteristic is constant pressure simple filtration resistance.

4. The method according to claim 2, wherein the operating conditions comprise filtration time.

5. The method according to claim 4, wherein the filtration time is approximately 28.5 minutes.

6. The method according to claim 2, wherein the operating conditions comprise membrane cleaning pattern conditions.

7. The method according to claim 1, wherein the operating time range ranges from approximately 10 minutes after starting the filtration to approximately the time to complete 3 air scrubbing and backwashing cleaning steps, wherein the air scrubbing is to continuously permeate air through the membrane and, the backwashing is to permeate a liquid through the membrane in a flow direction opposite to a flow direction of the liquid to be treated during operation of the each of the existing membrane filtration plants.

\* \* \* \* \*

UNITED STATES PATENT AND TRADEMARK OFFICE
CERTIFICATE OF CORRECTION

| | | |
|---|---|---|
| PATENT NO. | : 9,492,791 B2 | Page 1 of 1 |
| APPLICATION NO. | : 11/792112 | |
| DATED | : November 15, 2016 | |
| INVENTOR(S) | : Takashi Ogawa et al. | |

It is certified that error appears in the above-identified patent and that said Letters Patent is hereby corrected as shown below:

In the Claims

In Claim 1, Column 13, Line 59, "liquid permeate" should read --liquid permeates--.

In Claim 1, Column 13, Line 64, "liquid permeate" should read --liquid permeates--.

In Claim 1, Column 14, Lines 21-22, "liquid permeate" should read --liquid permeates--.

In Claim 1, Column 14, Line 23, "liquid permeate" should read --liquid permeates--.

In Claim 2, Column 14, Line 53, "conditions is" should read --conditions are--.

In Claim 3, Column 14, Line 56, "The estimating method" should read --The method--.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*